United States Patent
Barak et al.

(10) Patent No.: US 7,925,232 B2
(45) Date of Patent: Apr. 12, 2011

(54) REDUCED COST MOBILE SATELLITE ANTENNA SYSTEM USING A PLURALITY OF SATELLITE TRANSPONDERS

(75) Inventors: Ilan Saul Barak, Kfar-Saba (IL); Danny Spirtus, Holon (IL); Doron Rainish, Ramat-Gan (IL); Stanimir Dimitrov Kamenopolski, Sofia (BG); Plamen Hristov Bazirgianov, Sofia (BG)

(73) Assignee: Raysat Inc, Vienna, VA (US)

( * ) Notice: Subject to any disclaimer, the term of this patent is extended or adjusted under 35 U.S.C. 154(b) by 591 days.

(21) Appl. No.: 12/042,697

(22) Filed: Mar. 5, 2008

(65) Prior Publication Data

US 2009/0061760 A1   Mar. 5, 2009

Related U.S. Application Data

(60) Provisional application No. 60/907,521, filed on Apr. 5, 2007.

(51) Int. Cl.
*H04B 1/26* (2006.01)

(52) U.S. Cl. ...................................... 455/196.1; 455/427

(58) Field of Classification Search .................. 455/427, 455/12.1, 430, 13.2, 560, 562.1, 428, 208, 455/209, 255, 259, 260, 310, 196.1
See application file for complete search history.

(56) References Cited

U.S. PATENT DOCUMENTS

| | | | |
|---|---|---|---|
| 6,694,137 B2* | 2/2004 | Sharon | 455/427 |
| 7,526,249 B2* | 4/2009 | Waltman et al. | 455/12.1 |
| 2004/0029549 A1* | 2/2004 | Fikart | 455/323 |

* cited by examiner

*Primary Examiner* — Tu X Nguyen
(74) *Attorney, Agent, or Firm* — D. Kligler I.P. Services Ltd.

(57) ABSTRACT

A system for utilizing circular polarized signals to perform satellite communication to mobile users. The satellite includes transponders, each transponder providing linearly polarized signals and at least two orthogonal linear polarized transponders. A plurality of mobile users with a circularly polarized antenna for receiving signals from the satellite, and singly circular or linear polarized transmit antennas for transmitting signals to the satellite. Circuits for providing a correction scheme implemented in a hub side to offset frequency error between two channels produced by the satellite transponder local oscillators mismatch.

8 Claims, 10 Drawing Sheets

REDUCED COST MOBILE SATELLITE ANTENNA SYSTEM USING A PLURALITY OF SATELLITE TRANSPONDERS

This application claims the benefit of U.S. Provisional Application 60/907,521, filed Apr. 5, 2007, the disclosures of which are incorporated by reference in their entirety.

FIELD

The present invention relates to a method and apparatus for satellite mobile communications using simple and low cost antenna terminals.

BACKGROUND

The satellite based high-speed communications to mobile platforms is an emerging technology, which allows to provide live video, TV programs or high speed Internet service to a variety of mobile platforms like cars, trains buses, boats etc. using geostationary satellites operating in Ku and in the future in Ka bands. The lower profile and small size of an antenna terminal is of great importance for better attachment or even integration in the vehicle roof.

To achieve this goal a dedicated service for mobile users should be established, exchanging satellite segment efficiency for smaller size and lower cost of mobile terminals. One of the possible solutions disclosed in the U.S. Pat. No. 6,694,137 is to provide service using signals with single circular polarization by utilizing two transponders processing linearly polarized signals. However, this solution only works when there is no frequency error between the two transponders used to create the circular polarized signals. This requirement is not met in the majority of satellites that are in service today.

SUMMARY

In the current invention the two linearly polarized signals transmitted by two satellite transponders are synchronized and phased properly in order to achieve circular polarization, with good quality over the whole service area. The quality of the circular polarization signals is controlled by the reference antennas located at the satellite hub. The use of single circularly polarized signals reduces significantly the complexity and respectively cost of mobile ground terminals especially in the case when low profile planar antennas or phased array antennas with electronically beam steering are used. For example in the case of fully electronically steerable phase array antenna the number of active microwave electronic components (amplifiers and phase shifters) may be reduced by factor of four (reduced by a factor of two due to the elimination of the requirement to have variable inclination linear polarization, and an additional factor of two due to the multiplication of the actual satellite radiated power by two due to the use of two transponders) reducing at the same time complexity of the feed-lines multilayer structure and cutting in that way significantly the cost of the antenna terminal. From another side the use of the single circular polarization makes possible to avoid the polarization tracking while moving, reducing significantly also the complexity of tracking and sensor terminal system.

In an additional implementation of the transmit part of such mobile terminal, as the relative angle of the vehicle towards the satellite is arbitrary, the wave polarization from a single linear polarized transmit antenna as seen from the satellite is also arbitrary. A circular polarized transponder will maintain this polarization at the hub receive side. The current method and apparatus addresses the implementation of a virtual circular transponder utilizing two linear transponders on the satellite.

Aspects of the invention permit the use of a dual linear polarized satellite system as if it were circularly polarized. This allows the complexity and cost of the mobile satellite terminals for both the forward and return directions to be significantly reduced. In the receive direction, the mobile terminal can comprise single circularly polarized radiators avoiding the complexity to support dual signal polarizations and polarization adjustment and tracking. In the transmit direction, the mobile terminal can transmit in one arbitrary polarization (linear or circular), again saving hardware and simplifying the terminal design.

In particular, aspects of the invention are directed to a method for deployment of single circularly polarized signals using two linearly polarized transponders on the selected satellite, combining and synchronizing them properly in order to achieve a good axial ratio of the circularly polarized signals over the serviced area.

DETAILED DESCRIPTION

Figure 1:
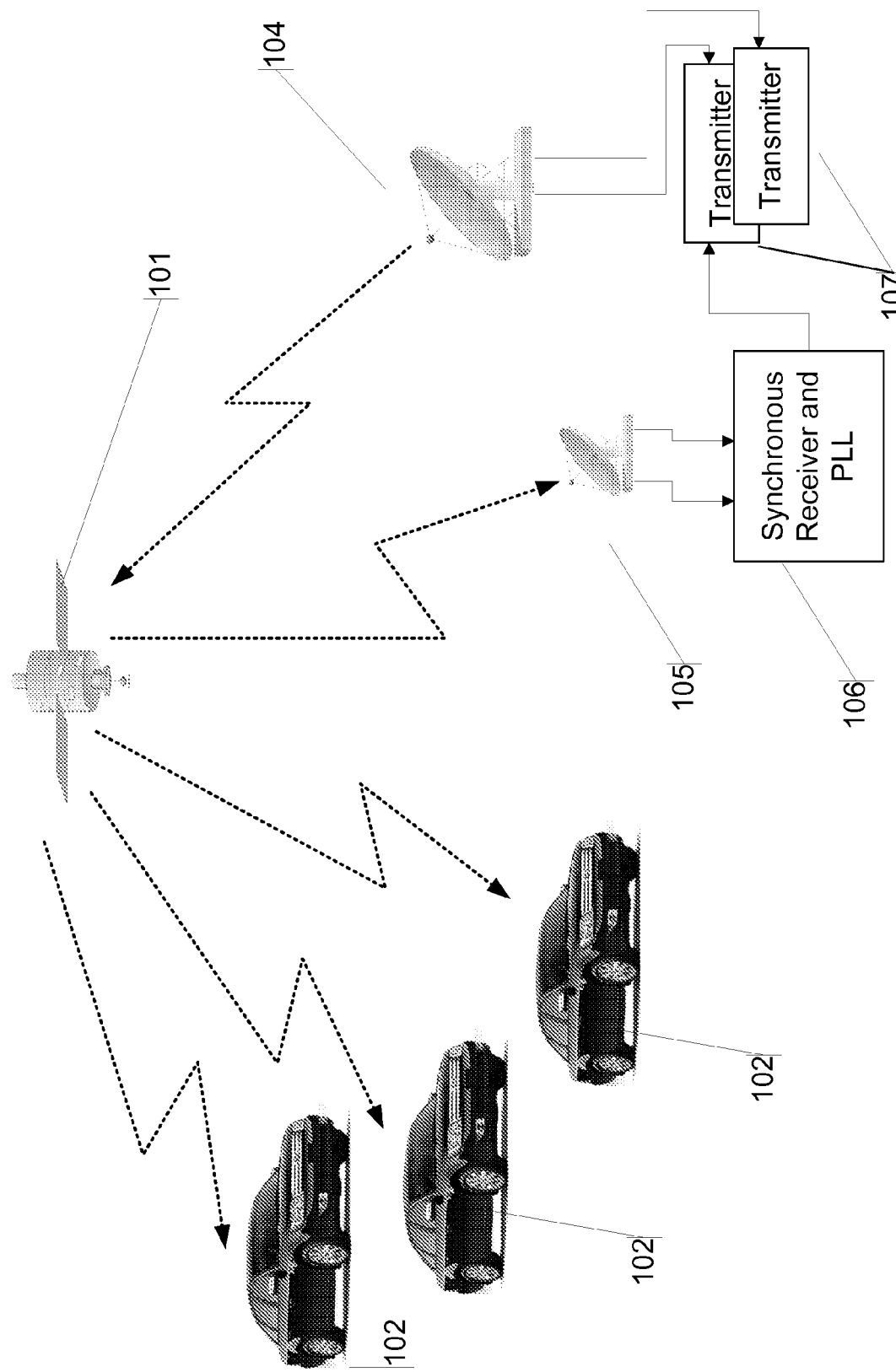
FIG. 1 illustrates a system to provide circular polarized signals to mobile users from linearly polarized satellites according to an aspect of the invention.

The claims alone represent the metes and bounds of the invention. The discussed implementations, embodiments and advantages are merely exemplary and are not to be construed as limiting the present invention. The description of the present invention is intended to be illustrative, and is not intended to limit the scope of the claims. Many alternatives, modifications and variations will be apparent to those skilled in the art.

The invention is directed to reducing the size and complexity of mobile satellite antennas, and especially electronic steerable antennas. It is advantageous to have the mobile receive antenna operate with a circular polarization, as this eliminates the necessity to control the wave polarization and so reduces the number of active element needed (phase shifters, attenuators and low noise amplifiers). For the transmit part of the mobile antenna, it is beneficial to transmit in one linear polarization. However, to service a mobile terminal with a fixed polarization in its own coordinates necessitates the use of a circularly polarized satellite transponder, and furnish the hub receiver with a method to adjust to this polarization. Circularly polarized satellites are rare and expensive, and thus it is beneficial to find a method to use existing, linearly polarized satellites to behave like circularly polarized ones, and support the above described terminal simplification. Aspects of the invention are directed to a system and method for making a linear polarized satellite that comprises linear polarized antennas and transponder to behave like a circular polarized satellite.

The following explanation relates to two linear orthogonal transponders that have some overlapping frequency, and will later be expanded to a full satellite payload that usually has many transponders that have overlapping frequency bands. Providing circular polarization from two orthogonal linear antennas is described in, for example, in the "Antenna Engineering Handbook" by Richard C Johnson on page 23-24. "A circularly polarized wave will be produced by the coexistence of a vertically and a horizontally polarized wave, each having the same amplitude and with a 90° degrees phase difference between them". The difficulty in providing a constant 90° from a realistic satellite is due to the V and H transponders having different, unlocked LO oscillators that perform frequency translation between the up and down links. This LO frequency difference creates a time varying phase difference between the V and H transponders. This invention discloses the methods and apparatus used to maintain this 90° phase difference in the forward and reverse directions, despite this LO frequency (and phase) error and does not necessitate the transponders to have the same downconversion LO frequency in order to produce a truly circular field. The forward channel in a satellite communication system for mobile terminals comprises an uplink where the signal is transmitted from the hub to the satellite and a downlink where the signal is transmitted from the satellite to the mobile terminal. Likewise, the return channel comprises an uplink from the mobile terminal to the satellite, and a downlink from the satellite to the hub. The method and apparatus differ for the case of forward and reverse directions. For the forward direction (from the hub via the satellite to the mobile antenna), the correction is performed in hub transmitter.

This correction is applied by measuring the phase difference between the transponders shifting the uplink signal phases to the satellite to offset the phase error.

In the case of the return channel, the correction is applied in the hub, and is performed separately for each mobile terminal transmission. For each mobile terminal wishing to transmit, there will be an allocated receiver in the hub. This receiver will preferably be implemented using digital circuits, has two channels, coupled to the V and H channels respectively. Phase and frequency are then estimated using the information from these two channels, and phase correction is then applied. The two channels are optimally combined.

The present invention is directed to providing single circular polarization using two linear satellite signals in order to support mobile service for users equipped low profile phased array antennas. The service using single circularly polarized signals allows cutting the cost and complexity of the low profile phase array antennas. A satellite comprising transponders working with linearly polarized signals may produce circularly polarized signals if two transponders are connected respectively to the vertical (V) and the horizontal (H) inputs of the satellite antenna on the satellite having exactly the same frequency and shifted by 90° in phase. However, satellites that are in service currently do not perform exactly the same frequency down conversion on the V and H channels, which will result in a frequency shift between the V and H transponder output when the uplink from the hub will have the same frequency in the V and H channels.

In one aspect of the invention, a single channel formed using two overlapping transponders may be utilized to provide real circular polarization. In this case a channel bandwidth is limited to 16 MHz (in case of 36 MHz transponders and gaps between transponders with identical polarization of 4 MHz). One or more video channels may be transmitted in this common overlap frequency band. One of the main challenges to form good quality circularly polarized signals using linear transponders is correcting for the unknown and time varying frequency and phase difference of the separate local oscillators in the transponders. The V and H channels of a "bend pipe" satellite transponders do not share a common local oscillator for the down conversion and the dynamic compensation of the frequency shift between V and H downlink transmissions should be applied.

Another challenge to overcome is the different group delay of the signals which passes through the two overlapping transponders since the signals passes through different parts of the operational bands of the transponder, which may have different phase and amplitude responses. The phase and amplitude mismatches may degrade the quality of the circularly polarized signal. From another side the phase delay of each transponder may differ significantly and need to be compensated. Another issue is the physical location of the antenna (or antennas) radiating linearly polarized signals. In order to achieve good quality of the circularly polarized signal over the serviced area the satellite V and H antennas should be collocated. The use of dual feed antenna may be a preferred solution for many embodiments. The challenges may be overcome using the methods described in the present invention. In order to overcome the frequency difference between the local oscillators of the H and V transponders, the master (hub uplink) signals may be manipulated. The master signals are processed by a monitoring device in the hub station and the received information for the frequency and phase shift between H and V channels is used to control properly the frequency and phase of the two uplink channels in order to achieve pure circular polarization for the down link signal, forming in that way a feedback close loop.

The present invention may be exemplified by several applications of the methods and system embodying forming of pure single circularly polarized signal using linearly polarized satellite transponders for satellite mobile service utilizing low profile antenna terminals.

One exemplary embodiment of the single circular polarization service to provide circular polarization to mobile terminals in the forward link is illustrated in FIG. 1. The geostationary satellite 101 provides high-speed data service to a plurality of mobile users 102 equipped with low profile electronically steerable antennas. The ground reference antenna 105 connected to the synchronous receiver 106 provides information about the dynamic phase and amplitude changes in the downlink H and V channels. The two signals representing the V and H channels are then compared in a phase locked loop circuit and transferred to the one of the two hub up link transmitter 107 and used to correct the phase and frequency of one of the two H V uplink channels, transmitted toward the satellite by hub antenna 104. The corrections are used to compensate the phase and amplitude changes due to the differences in the time delays, and phase responses of the satellite transponders and frequency shifts between local oscillators in transponder's receivers in order to accomplish a true (low axial ratio) circular polarization in the downlink master channel.

Figure 2:
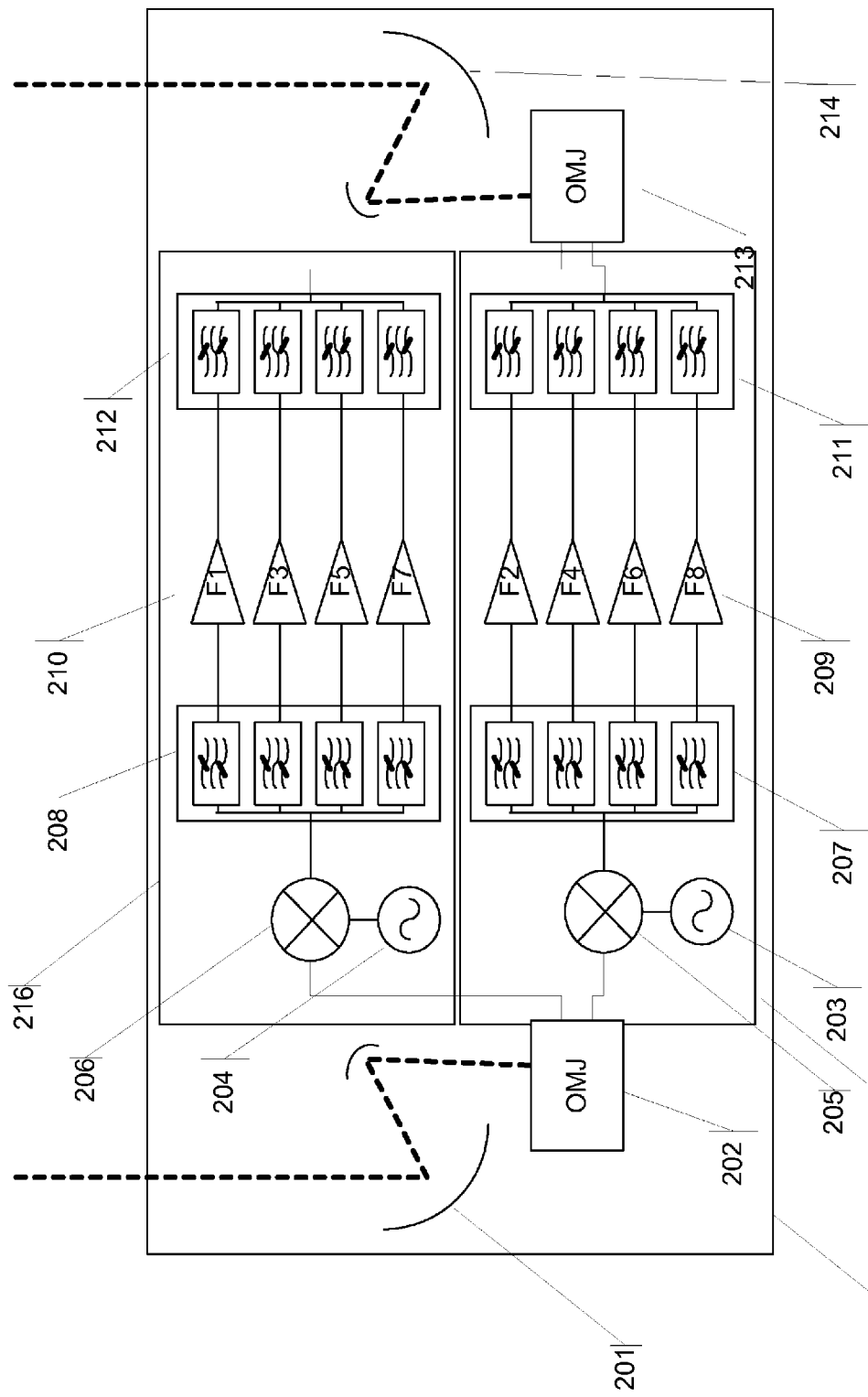
FIG. 2 illustrates a satellite configuration according to an aspect of the invention

FIG. 2 shows the satellite payload configuration as used in this invention. The uplink signal is received in the receive antenna 201 and is converted to uplink signals representing the V and H uplink signals. These signals are fed to mixers 205 and 206, respectively. Each of these mixers performs frequency translation from the uplink frequency, which in the Ku band is situated between 14 and 14.5 GHz to the downlink frequency band, which is around 12 GHz. Local oscillators 203 and 204 provide the signal necessary to create the frequency conversion between the uplink frequency and the downlink frequency. Input multiplexers 207 and 208 separate the broadband uplink signal to channels according to the power amplifier 210 bandwidth, typically 36 MHz each. The output of these power amplifiers is combined in output multiplexers 211 and 212. The resultant broadband signals feed the V and H inputs of the orthomode feed 213.

The two local oscillators 203 and 204 do not have the exact same frequency, and therefore a correction for their relative phase and frequency errors needs to be compensated for, in order to achieve the desired circular polarization.

Figure 3:
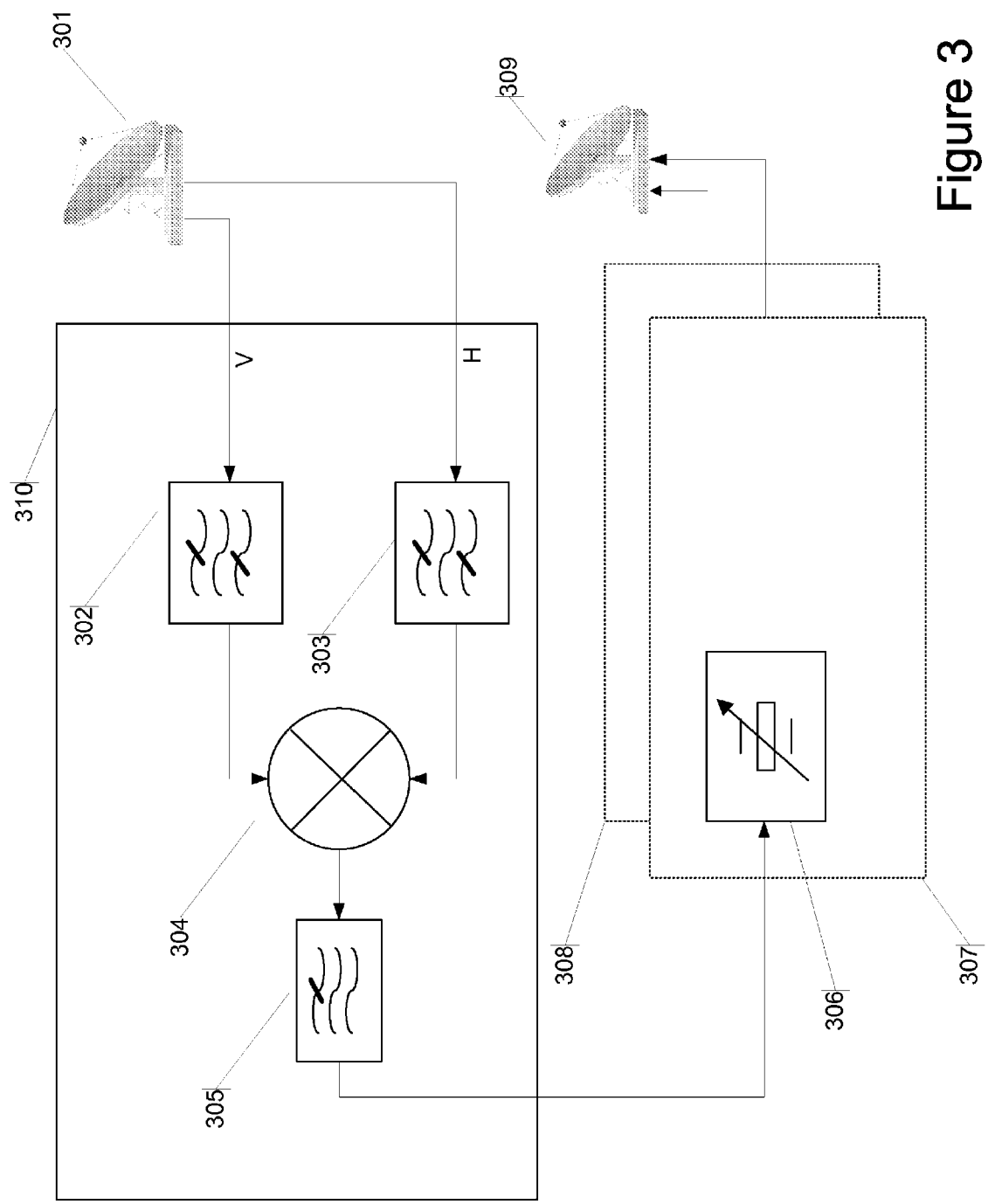
FIG. 3 illustrates a master channel PLL circuit according to an aspect of the invention.

For the forward channel, this correction is performed in the hub. FIG. 3 is a simplified description of the circuit used to precondition the forward channel uplink. A sample of the downlink forward channel is received in the hub by a sampling antenna 301. This antenna comprises an orthogonal feed sampling the V and H channels respectively. The two signals may for example be BPSK modulated. The V and H signals are fed via band pass filters 302 and 303 to a mixer 304 that acts as a phase comparator. Its output passes through a low pass filter 305 to influence the frequency of the forward channel uplink upconverter 307, which transmits for example the V polarized signal, by controlling its clock frequency generated by crystal oscillator 306. The second upconverter transmitting for example the H polarization is not controlled. The signal from the upconverters is transmitted to the satellite via the orthogonal feed antenna 309. A second upconverter 308, transmitting on the V polarization in this example, generates a signal from a fixed reference. In this way, the phase error between the downlink V and H signals will only influence the absolute phase of upconverter 307 so as to correct for this error.

The Mixer 304 output signal average is related to the phase shift between the two received signals. This is true for CW signals, and is also true for identically modulated BPSK modulated signals. The low cut off frequency low-pass filter 305, which may have for example cut off frequency below 1 Hz, reduces the effective receiver bandwidth and enables the operation at very low levels of the received signals, for example below −150 dBm. It also enables the compensation of relatively high delays in the feedback close loop due to the up and downlink time delays.

Figure 4:
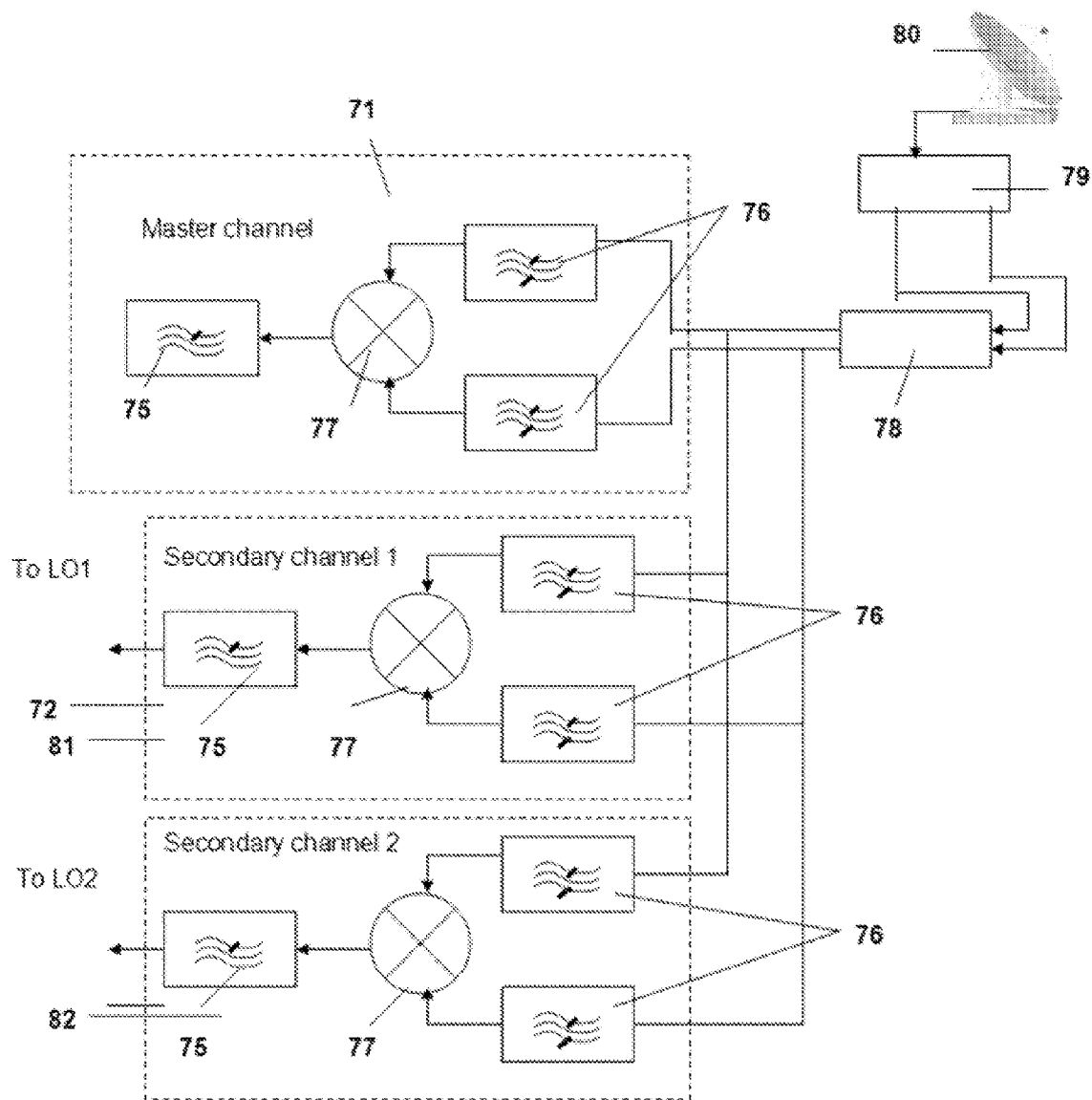
FIG. 4 illustrates secondary channel phase correction block diagram according to an aspect of the invention.

In a realistic system that incorporates many channels in both the uplink and downlink, the channels are usually arranged as described in FIG. 1. All the overlapping regions that are indicated can be used to provide circular polarization signals. In the case of providing circular polarization inn the forward channel, it is necessary to compensate each pair of transponders. For example, the upconvetrer servicing transponder 1H will be corrected by the comparison of the signals emitted from the forward channel downlink signals from transponders 1V and 1H. The upconvetrer servicing transponder 2V will be corrected by the comparison of the signals emitted from the forward channel downlink signals from transponders 1H and 2V. FIG. 4 illustrates the circuitry needed in the hub to create these corrections. The received signal forward channel downlink is received in antenna 70 and is fed to dual LNB 71. the LNB feed a multiplicity of PLL blocks, in this example indicated as 310, 310a and 310b. In reality, the number of such blocks represent the number of common channels, as illustrated in FIG. 10, for simplicity, the following description pertains to PLL block 84. The two transponder signals is selected by bandpass filter 72 and 73 and phase compared in mixer 74. The output is lowpass filtered by filter 74 and sent to correct for the phase error is the relevant clock generator in the appropriate upconverter.

Figure 5A:
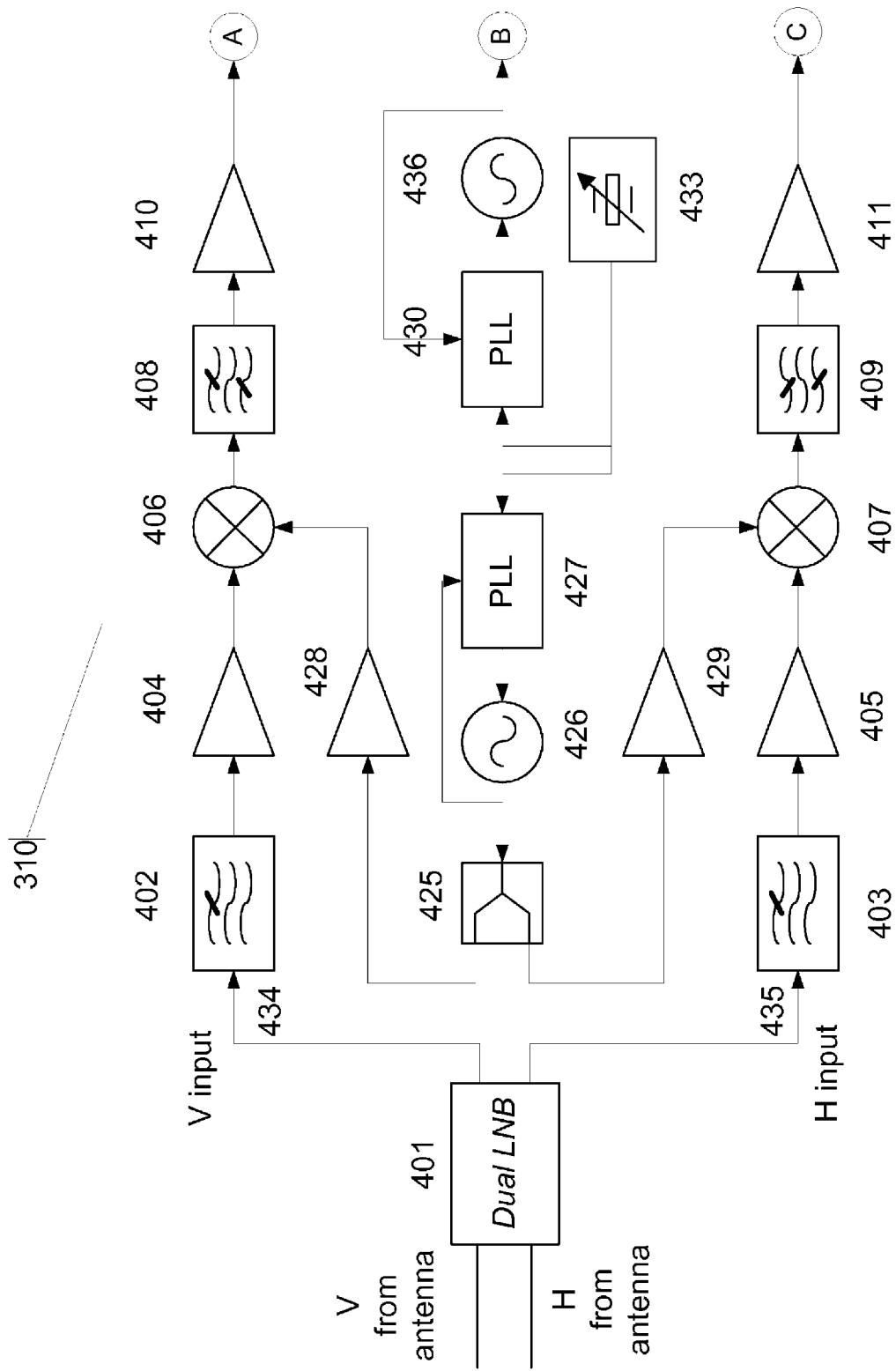
FIG. 5 illustrates a detailed realization of the circuit shown in FIG. 4 according to an aspect of the invention.
Figure 5B:
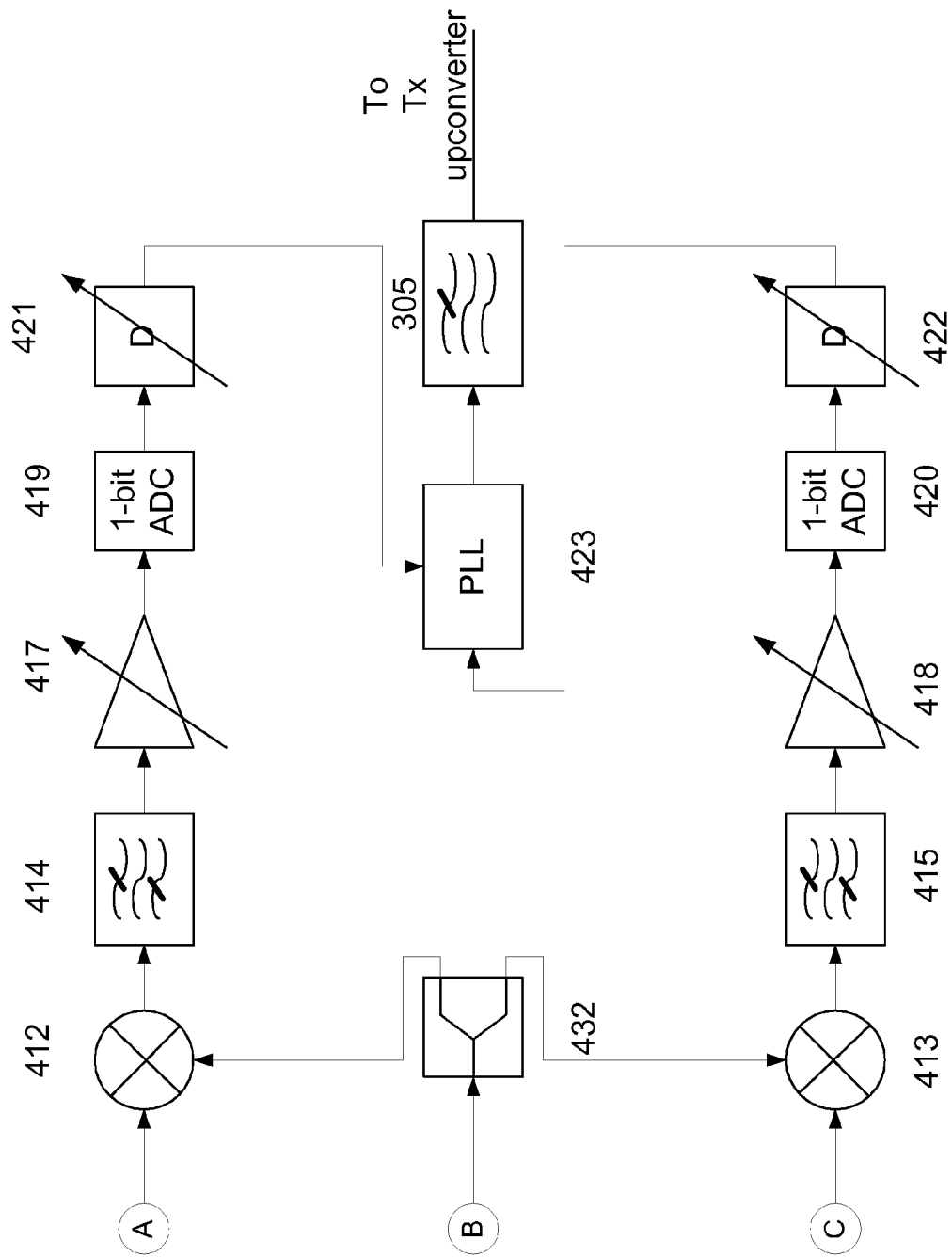

FIG. 5 shows a detailed preferred realization of the circuit shown in FIGS. 3 and 4, and actual implementation of the circuit block 310. The signal received from the antenna is downconverted in a dual LNB 410. This LNB uses a common local oscillator that guaranties that there is difference in the downconversion (LO) frequency error between the V and H channels, though there may be a time invariable phase difference. The first IF outputs 434 and 435 filtered by filters 402 and 403, amplified by amplifiers 404 and 405 and are fed to mixers 406 and 407. The LO port of mixers 406 and 407 is fed from a phase locked LO 426 via power divider 425 and buffer amplifiers 428 and 429. The LO 426 is phase locked to the clock oscillator 433 by PLL block 427. The mixers 406 and 407 output at IF2 frequency go through an image rejection filter 408 and 409, which are preferably implemented in SAW technology in the 800 MHz range. IF2 signals from these filters undergo amplification in IF amplifiers 410 and 411, and then are fed to second mixers 412 and 413 whose LO signals is generated by local oscillator 436 that is phase locked to reference oscillator 432 via PLL block 430. The LO signal from the common LO oscillator 436 is provided to the two mixers via power divider 432. The output of mixers 412 and 413, pass through band pass channel filters 414 and 415. These filters are preferably at 700 MHz, and their bandwidth is chosen according to the modulated signal bandwidth.

The output of these filters pass through variable gain amplifiers 417 and 418, whose gain is adjusted according to the received signal strength, and is sampled by comparators 419 and 420. Programmable delay circuits 421 and 422 are adjusted to compensate for the V and H channel phase delay mismatch. The output of these is fed into a phase locked loop circuit 423, whose output is filtered by low pass filter 305. This filter must be narrow band in order to achieve the good sensitivity required from this receiver, while marinating the amplitude and phase responses needed to achieve a stable closed loop operation.

Figure 6:
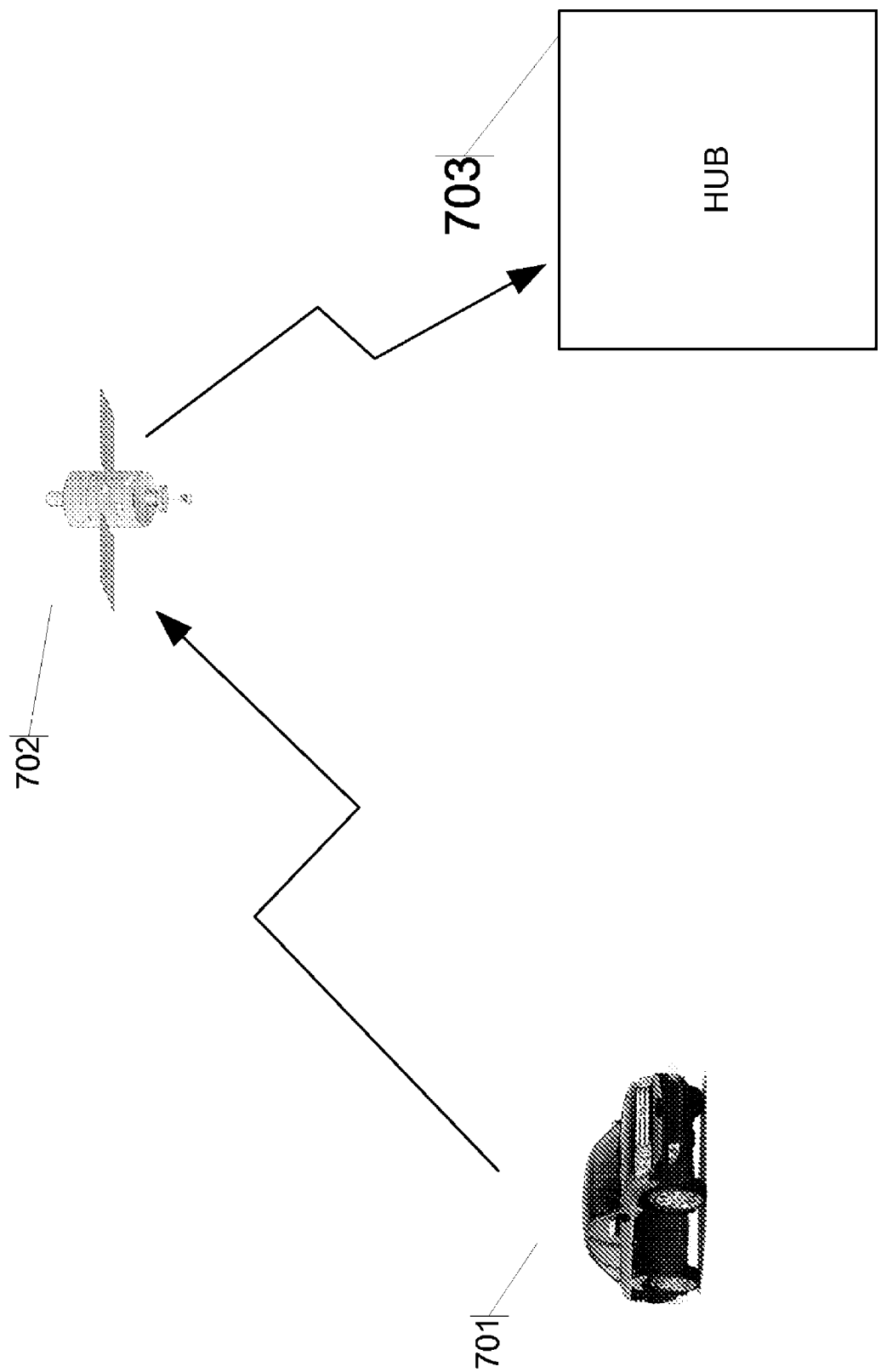
FIG. 6 illustrates a return channel having a mobile terminal transmitting in a fixed polarization relative to the terminal according to an aspect of the invention.
Figure 7:
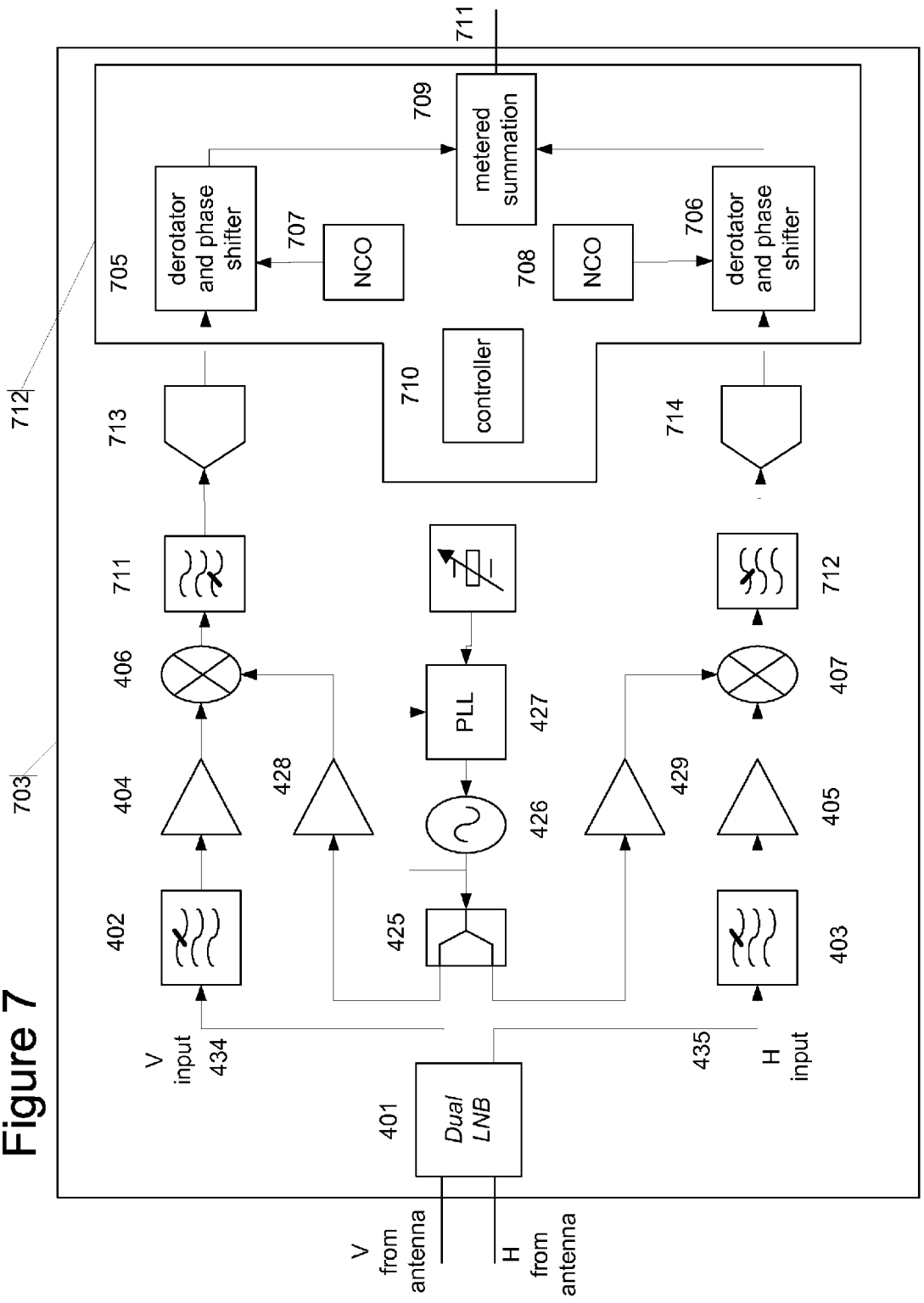
FIG. 7 illustrates a receive system located in the hub of FIG. 8 according to an aspect of the invention.

Another aspect is shown in FIG. 6 relating to the return channel, the mobile terminal 701 transmits in a fixed polarization relative to the terminal. As the angular relationship to the satellite in arbitrary, the received signal at the satellite 702 will have an arbitrary inclination angle linear polarization. In this embodiment, like in the previous one, the signal frequency is designed to exist in the overlapping frequency range of a V and H transponder. The two components (V and H) will undergo the frequency translation performed by the V and H local oscillators in satellite, and therefore will need compensation in the receiver. The receive system is located in hub 703 and is explained in FIG. 7. The signal is received by an orthomode antenna and fed to the V and H inputs of a dual LNB 401. Each of these inputs is downconverted and filtered by Lpw pass filters 403, mixers 406 and 407 and antialias filters 711 and 712. The signals are then sampled into the digital domain by analog to digital converters 713 and 714. The signals are corrected for phase and amplitude errors introduced by the satellite LO's using derotator and phase shifters 705 and 706, driven by NCO's 707 and 708. The values of these NCO's are set by sampling the outputs of 705 and 706 by the controller 710, that is responsible to maximize the output 711 of the metered combiner 709.

In a typical system, there will be many remote terminals transmitting on the return channel, each on a separate sub carrier or in a different time slice. Therefore, many sub-systems 713 will exist in parallel, each processing the transmission originating from a single mobile terminal. In a properly managed system, two subscribers can share the same frequency and time slice, if they are orthogonal (or practically orthogonal) in polarization.

For a multiplicity of mobile terminals, it is statistically possible, that the mobile terminal population can be divided into pairs, such that within each pair, the two mobile terminals transmit in essentially orthogonal polarizations. In this way, the number of mobile transmitters transmitting at the same time instance, can be twice the number of available frequency slots.

In another implementation for the reverse channel uplink, it is possible that the mobile terminal uplink will have circular polarization.

Figure 8:
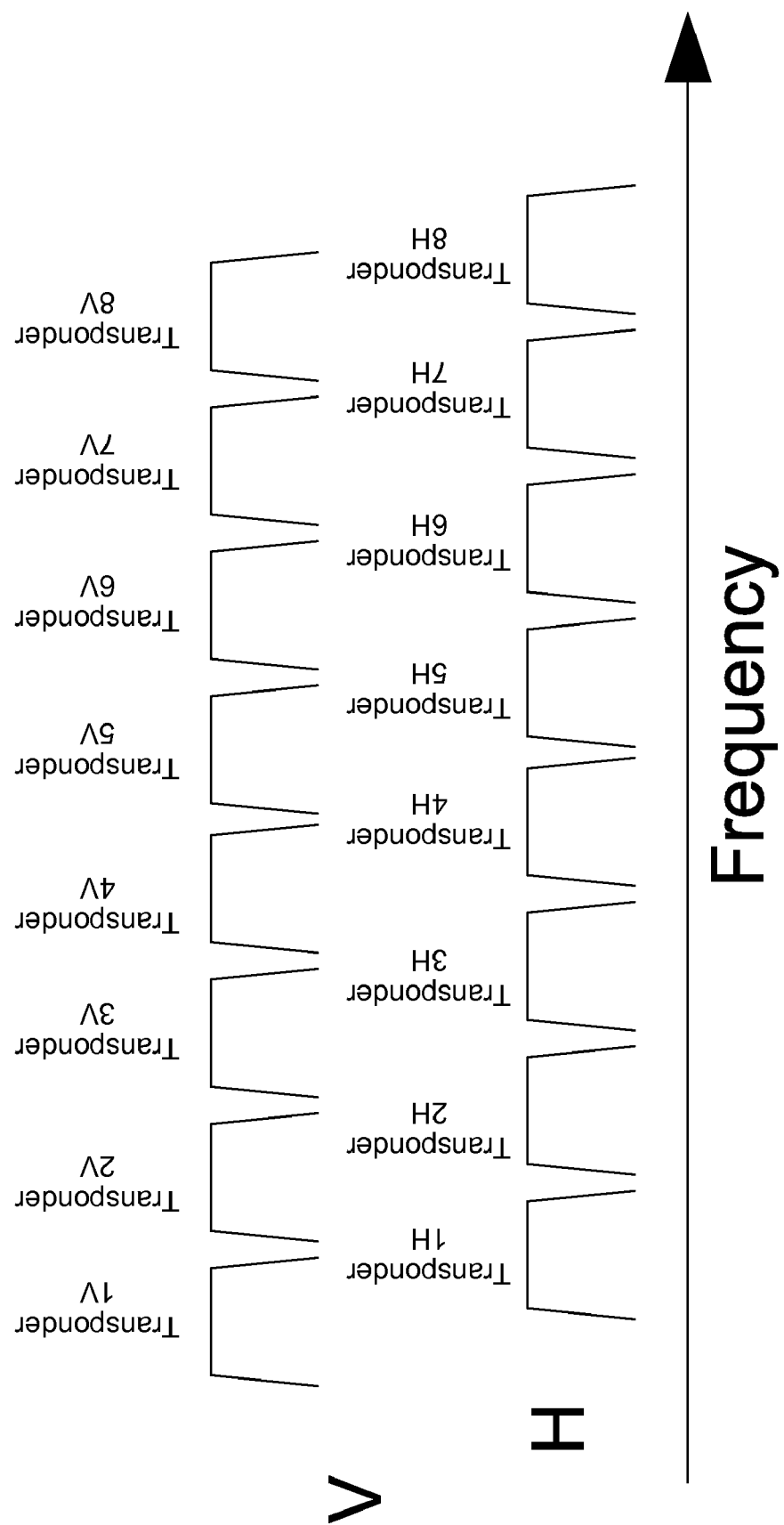
FIG. 8 illustrates vertical and horizontal transponders, located in the frequency domain of a satellite where vertical and horizontal transponders are skewed.
Figure 9:
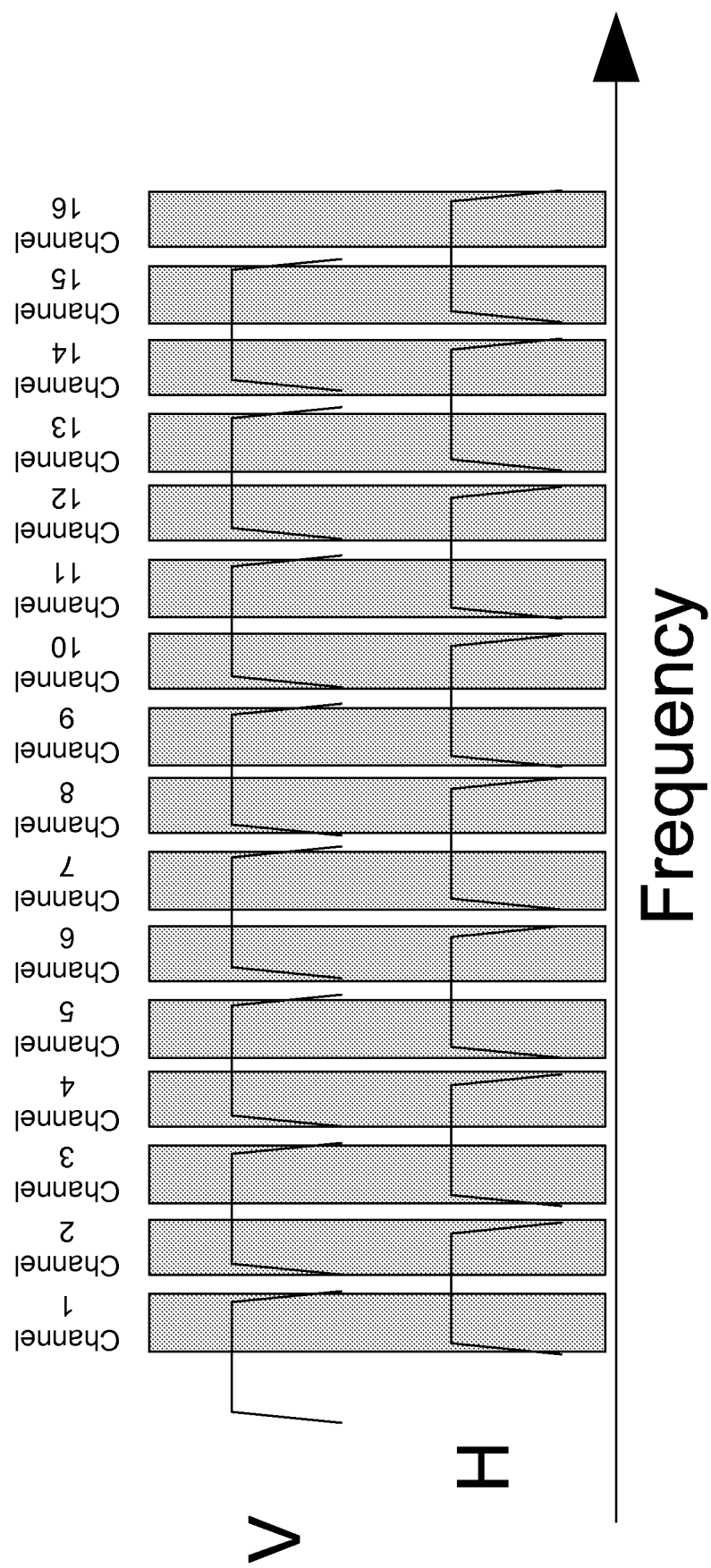
FIG. 9 illustrates a schemed satellite wherein each channel uses a V and H transponder in the same frequency according to an aspect of the invention.

Most satellites comprise vertical and horizontal transponders, located in the frequency domain as shown in FIG. 8. Vertical and horizontal transponders are skewed, with some common frequency range. An efficient utilization of such a schemed satellite is shown in FIG. 9 where each channel, which must use a V and H transponder in the same frequency, can use for example the lower half bandwidth of transponder 1H and the upper half bandwidth of transponder 1V. In this way, a maximum use of the satellite according to this invention can be utilized

What is claimed is:

1. A system for utilizing circular polarized signals to perform satellite communication to mobile users, by satellite comprising transponders, each transponder providing linearly polarized signals, the system comprising:
   a satellite with at least two orthogonal linear polarized transponders;
   a plurality of mobile users with a fixed polarization antenna, and
   a correction scheme implemented in a hub side to offset frequency error between two channels produced by satellite transponder local oscillators mismatch,
   wherein the fixed polarization is circular polarization,
   and wherein the orthomode device comprises a dual downconverter, at least two band pass phase matched filters, a phase difference detecting device and narrowband low pass filter, configured to provide signals for at least one clock controls in the hub station.

2. A system according claim 1, further comprising at least two overlapping transponders, radiating linearly polarized signals and utilizing two carriers per channel.

3. A system for utilizing circular polarized signals to perform satellite communication to mobile users, by satellite comprising transponders, each transponder providing linearly polarized signals, the system comprising:
   a satellite with at least two orthogonal linear polarized transponders;
   a plurality of mobile users with a fixed polarization antenna, and
   a correction scheme implemented in a hub side to offset frequency error between two channels produced by satellite transponder local oscillators mismatch,
   further comprising a closed feedback loop controlling frequency and phase of hub uplink transmitters to compensate for frequency error between the satellite transponder local oscillators, a reference antenna on the ground, comprising orthomode device and dual channel downconverter; at least one phase difference detecting blocks comprising phase detecting devices, to close feedback loop in order to support good quality of the circularly polarized downlink signal,
   wherein the low pass filter allows bandwidth less than 1 Hz to achieve high sensitivity of the close loop and to compensate time delay of the signal going to and coming from a geostationary satellite.

4. A system for utilizing circular polarized signals to perform satellite communication to mobile users, by satellite comprising transponders, each transponder providing linearly polarized signals, the system comprising:
   a satellite with at least two orthogonal linear polarized transponders;
   a plurality of mobile users with a fixed polarization antenna, and
   a correction scheme implemented in a hub side to offset frequency error between two channels produced by satellite transponder local oscillators mismatch,
   further comprising at least two reference master channels, each channel working with vertical or horizontal polarization to provide information about the amplitude and phase differences in the other channel pairs and used to form single circularly polarized signals.

5. A system for utilizing circular polarized signals to perform satellite communication to mobile users, by satellite comprising transponders, each transponder providing linearly polarized signals, the system comprising:
   a satellite with at least two orthogonal linear polarized transponders;
   a plurality of mobile users with a fixed polarization antenna, and
   a correction scheme implemented in a hub side to offset frequency error between two channels produced by satellite transponder local oscillators mismatch,
   wherein the information, provided by the master channels for phase and amplitudes differences in the linearly polarized channel pairs (secondary channel pairs) is used to control the local oscillators in the hub uplink transmitter in order to achieve good quality of the downlink circularly polarized signals composed by the linearly polarized secondary channel pairs.

6. A system for utilizing circular polarized signals to perform satellite communication to mobile users, by satellite comprising transponders, each transponder providing linearly polarized signals, the system comprising:
   a satellite with at least two orthogonal linear polarized transponders;
   a plurality of mobile users with a fixed polarization antenna, and
   a correction scheme implemented in a hub side to offset frequency error between two channels produced by satellite transponder local oscillators mismatch,
   wherein the information, provided by the master channels for phase and amplitudes differences in the linearly polarized channel pairs (secondary channel pairs) is used to control the local oscillators in the hub uplink transmitter in order to achieve good quality of the downlink circularly polarized signals composed by the linearly polarized secondary channel pairs,
   and wherein the carriers processed by the each one of the two overlapping transponders having identical frequencies and opposite horizontal and vertical polarizations are used to form pure circularly polarized signal over the serviced area on the ground.

7. A system for utilizing circular polarized signals to perform satellite communication to mobile users, by satellite comprising transponders, each transponder providing linearly polarized signals, the system comprising:
- a satellite with at least two orthogonal linear polarized transponders;
- a plurality of mobile users with a fixed polarization antenna, and
- a correction scheme implemented in a hub side to offset frequency error between two channels produced by satellite transponder local oscillators mismatch, wherein the hub includes a plurality of receivers, each receiver comprising two receive chains, each chain responsive to a different received polarization, wherein the output of the receivers is phase and frequency shifted, and combined to a single output.

8. A system according to claim 7, where the mobile terminal transmits at a fixed linear polarization in his local coordinate system.

* * * * *